United States Patent
Budinsky et al.

(10) Patent No.: US 9,177,000 B2
(45) Date of Patent: Nov. 3, 2015

(54) DATA INDEX USING A LINKED DATA STANDARD

(75) Inventors: Frank J. Budinsky, Newmarket (CA); James J. Des Rivieres, Ottawa (CA); Martin P. Nally, Laguna Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/460,205

(22) Filed: Apr. 30, 2012

(65) Prior Publication Data

US 2013/0290253 A1    Oct. 31, 2013

(51) Int. Cl.
G06F 7/00 (2006.01)
G06F 17/00 (2006.01)
G06F 17/30 (2006.01)

(52) U.S. Cl.
CPC .... G06F 17/30321 (2013.01); G06F 17/30557 (2013.01); G06F 17/30575 (2013.01)

(58) Field of Classification Search
CPC ..................... G06F 17/30575; G06F 17/30321
USPC .................................................. 707/624, 741
See application file for complete search history.

(56) References Cited

U.S. PATENT DOCUMENTS

| | | | |
|---|---|---|---|
| 6,584,477 B1 * | 6/2003 | Mosher, Jr. | ................... 707/610 |
| 6,694,307 B2 | 2/2004 | Julien | |
| 2006/0112109 A1 | 5/2006 | Chowdhary et al. | |
| 2007/0011134 A1 | 1/2007 | Langseth et al. | |
| 2007/0198602 A1 * | 8/2007 | Ngo et al. | .............. 707/999.201 |
| 2008/0243908 A1 * | 10/2008 | Aasman et al. | ......... 707/999.002 |
| 2009/0132528 A1 * | 5/2009 | Albornoz et al. | ...... 707/999.005 |
| 2010/0030725 A1 * | 2/2010 | Mendis et al. | ............. 707/999.1 |
| 2010/0115000 A1 * | 5/2010 | Youngren | ..................... 707/818 |
| 2010/0179941 A1 * | 7/2010 | Agrawal et al. | ............... 707/624 |
| 2011/0029480 A1 | 2/2011 | DeLucia | |
| 2011/0040727 A1 | 2/2011 | Golab et al. | |
| 2011/0078166 A1 * | 3/2011 | Oliver et al. | .................. 707/760 |
| 2011/0196830 A1 * | 8/2011 | Zunger et al. | ................. 707/624 |
| 2012/0095974 A1 * | 4/2012 | Bentkofsky et al. | .......... 707/703 |
| 2012/0173537 A1 * | 7/2012 | Shaffer et al. | ................. 707/741 |
| 2013/0085993 A1 * | 4/2013 | Li et al. | ......................... 707/636 |

OTHER PUBLICATIONS

Christian Bizer, et al.,"Linked Data—The Story So Far," IGIP, International Journal on Semantic Web and Information Systems, vol. 5, Issue 3, pp. 1-3, 2009.

(Continued)

*Primary Examiner* — Usmaan Saeed
*Assistant Examiner* — Brian E. Weinrich
(74) *Attorney, Agent, or Firm* — Cantor Colburn LLP; Ryan Lewis

(57) ABSTRACT

A data indexing system including a plurality of servers and a tracked resource set client is provided. Each of the servers includes a plurality of resources that are part of a resource set. Each of the servers also includes a tracked resource set corresponding to the resource set. The tracked resource set describes the plurality of resources located in the resource set. The server identifies the plurality of resources using rules of linked data. The tracked resource set client is in communication with the plurality of servers. The tracked resource set client has a data index. The data index is built and kept up to date using the tracked resource set of each of the plurality of servers.

9 Claims, 6 Drawing Sheets

(56) References Cited

OTHER PUBLICATIONS

Data Warehouse Design, [online]; [retrived on Apr. 3, 2012]; retrieved from the Internet http://www.1keydata.com/datawarehousing/processes.html 1KeyData, Data Warehouse Design, 1 page, 2012.

Chuck Ballard, et al., "Data Warehousing with the Informix Dynamic Server," IBM Redbooks, pp. 1-84, Sections 1 & 2 Only, Dec. 2009.

Olaf Hartig, et al., "A Database Perspective on Consuming Linked Data on the Web," Computer and Information Science, vol. 10, Issue, 2, pp. 1-10, 2010.

IBM—DeveloperWorks, [online]; [retrived on Apr. 3, 2012]; retrieved from the Internet http://www.ibm.com/developerworks/data/library/techarticle/dm-0505cullen/IBM DeveloperWorks, Business Intelligence Solutions Architecture, pp. 1-12, 2005.

W3, [online]; [retrived on Apr. 3, 2012]; retrieved from the Internet http://www.w3.org/DesignIssues/LinkedData.html W3, Tim Berners-Lee, "Linked Data," Design Issues, pp. 1-9, 2006.

Open Services for Lifecycle Collaboration, [online]; [retrived on Apr. 19, 2012]; retrieved from the Internet http://open-services.net/ Open Services, About OSLC, pp. 1-7, 2012.

W3C, [online]; [retrived on Apr. 30, 2012]; retrieved from the Internet http://www.w3.org/2007/02/turtle/primer/#L2986 W3C RDF Primer—Turtle Version, pp. 1-36, 2007.

Youchan Zhu, et al., "Data Updating and Query in Real-time Data Warehouse System," International Conference on Computer Science and Software Engineering, IEEE; pp. 1295-1297, 2008.

\* cited by examiner

```
# Resource: http://cm1.example.com/trackedResourceSet
@prefix trs: <http://jazz.net/ns/trs#> .

<http://cm1.example.com/trackedResourceSet>
  a trs:TrackedResourceSet ;
  trs:base <http://cm1.example.com/baseResources> ;
  trs:changeLog [
    a trs:ChangeLog ;
    trs:changes ( ... ) .
  ] .
```

FIG. 2

```
# Resource: http://cm1.example.com/trackedResourceSet
@prefix trs: <http://jazz.net/ns/trs#> .
@prefix dcterms: <http://purl.org/dc/terms/> .
@prefix xsd: <http://www.w3.org/2001/XMLSchema#> .

<http://cm1.example.com/trackedResourceSet>
  a trs:TrackedResourceSet ;
  trs:base <http://cm1.example.com/baseResources> ;
  trs:changeLog [
    a trs:ChangeLog ;
    trs:changes (
      <urn:urn-3:cm1.example.com:2010-10-27T17:39:33.000Z:103>
      <urn:urn-3:cm1.example.com:2010-10-27T17:39:32.000Z:102>
      <urn:urn-3:cm1.example.com:2010-10-27T17:39:31.000Z:101>
    ) .
  ] .

<urn:urn-3:cm1.example.com:2010-10-27T17:39:33.000Z:103>
  a trs:Creation ;
  trs:changed <http://cm1.example.com/bugs/23> ;
  trs:order "103"^^xsd:integer .

<urn:urn-3:cm1.example.com:2010-10-27T17:39:32.000Z:102>
  a trs:Modification ;
  trs:changed <http://cm1.example.com/bugs/22> ;
  trs:order "102"^^xsd:integer .

<urn:urn-3:cm1.example.com:2010-10-27T17:39:31.000Z:101>
  a trs:Deletion ;
  trs:changed <http://cm1.example.com/bugs/21> ;
  trs:order "101"^^xsd:integer .
```

FIG. 3

```
# Resource: http://cm1.example.com/trackedResourceSet
@prefix trs: <http://jazz.net/ns/trs#> .

<http://cm1.example.com/trackedResourceSet>
  a trs:TrackedResourceSet ;
  trs:base <http://cm1.example.com/baseResources> ;
  trs:changeLog [
    a trs:ChangeLog ;
    trs:changes (
      <urn:urn-3:cm1.example.com:2010-10-27T17:39:33.000Z:103>
      <urn:urn-3:cm1.example.com:2010-10-27T17:39:32.000Z:102>
      <urn:urn-3:cm1.example.com:2010-10-27T17:39:31.000Z:101>
    ) ;
    trs:previous <http://cm1.example.com/changeLog/1> .
  ] .

# Resource: http://cm1.example.com/changeLog/1
@prefix trs: <http://jazz.net/ns/trs#> .

<http://cm1.example.com/changeLog/1>
  a trs:ChangeLog ;
  trs:changes (
    <urn:urn-3:cm1.example.com:2010-10-27T17:39:30.000Z:100>
    ...
  ) .
```

FIG. 4

```
# Resource: http://cm1.example.com/baseResources
@prefix trs: <http://jazz.net/ns/trs#> .
@prefix rdfs: <http://www.w3.org/2000/01/rdf-schema#> .

<http://cm1.example.com/baseResources>
  trs:cutoffEvent
      <urn:urn-3:cm1.example.com:2010-10-27T17:39:31.000Z:101> ;
  rdfs:member <http://cm1.example.com/bugs/1> ;
  rdfs:member <http://cm1.example.com/bugs/2> ;
  rdfs:member <http://cm1.example.com/bugs/3> ;
  ...
  rdfs:member <http://cm1.example.com/bugs/199> ;
  rdfs:member <http://cm1.example.com/bugs/200> .
```

FIG. 5

```
# Resource: http://cm1.example.com/baseResources/page1
@prefix trs: <http://jazz.net/ns/trs#> .
@prefix rdfs: <http://www.w3.org/2000/01/rdf-schema#> .

<http://cm1.example.com/baseResources>
  trs:cutoffEvent
      <urn:urn-3:cm1.example.com:2010-10-27T17:39:31.000Z:101> ;
  rdfs:member <http://cm1.example.com/bugs/1> ;
  rdfs:member <http://cm1.example.com/bugs/2> ;
  rdfs:member <http://cm1.example.com/bugs/3> .

<http://cm1.example.com/baseResources/page1>
  trs:nextPage <http://cm1.example.com/baseResources/page2>
```

DATA INDEX USING A LINKED DATA STANDARD

BACKGROUND

The present invention generally relates to an approach for extracting data, and more specifically, to a data index using a linked data standard.

A single query may be performed on information that is stored on multiple computer programs, databases, files, or other types of data sources. One existing approach for performing the query involves extracting the data from individual sources, transforming the data into an architected organization, and then loading the data into a data warehouse. The data warehouse stores data from the various computer programs, databases, files or other data sources, where the data may be queried, analyzed, or reported. This approach may be referred to as an extract, transform, and load (ETL) process for building a data warehouse.

The ETL approach may have several drawbacks. For example, the ETL process may be relatively time-consuming. Thus, the ETL process is generally executed only once or twice in a day. As a result, the data contained in the warehouse may be relatively stale. Moreover, the ETL process is relatively complex and may be difficult to maintain, especially if new data types are introduced, or if changes are made to existing data types. Also, it may not be possible to automatically enforce various types of data control rules from the data sources on the data that is stored in the data warehouse.

SUMMARY

According to one embodiment, a data indexing system including a plurality of servers and a tracked resource set client is provided. Each of the servers includes a plurality of resources that are part of a resource set. Each of the servers also includes a tracked resource set corresponding to the resource set. The tracked resource set describes the plurality of resources located in the resource set. The server identifies the plurality of resources using rules of linked data. The tracked resource set client is in communication with the plurality of servers. The tracked resource set client has a data index. The data index is built and kept up to date using the tracked resource set of each of the plurality of servers.

In another embodiment, a method of data indexing to a tracked resource set client is provided. The method includes sending a request of a representation of a state of a plurality of resource sets by the tracked resource set client to a plurality of servers. Each resource set includes a plurality of resources. The method includes returning the representation of the state of the plurality of resource sets as a plurality of tracked resource sets, where each resource set corresponds to one of the tracked resource sets. The method includes identifying the plurality of resources using rules of linked data by each of the servers. The method includes saving a collection resources from each of the tracked resource sets in a data index that is part of the tracked resource set client.

BRIEF DESCRIPTION OF THE SEVERAL VIEWS OF THE DRAWINGS

FIG. 2 is an exemplary illustration of information returned to a data index shown in FIG. 1;

FIG. 3 is an exemplary illustration of a change log shown in FIG. 1;

FIG. 4 is an alternative embodiment of the change log in FIG. 3;

FIG. 5 is an exemplary illustration of a base shown in FIG. 1;

FIG. 6 is another exemplary illustration of the base shown in FIG. 1;

DETAILED DESCRIPTION

The ETL approach for building a data warehouse may be relatively time-consuming and complex, especially if new data types are introduced, or if changes are made to existing data types. Thus, there exists a need to provide an approach for obtaining data without a time-consuming transformation. Therefore, exemplary embodiments of the present disclosure describe a data indexing system, which requires no tables to maintain, and no mapping from a resource to a table. The data in exemplary embodiments of the data indexing system is already in a standard architected format such as resource description framework (RDF), which avoids the time-consuming transformation of the ETL approach. Without a time-consuming transformation, the data indexing system as described may be executed in near real-time. The data indexing system also provides the ability to execute a single query on information that is located on various computer programs, databases, or other data sources, with relatively low latency. The data indexing system as described may be used for extracting data from a relatively large number of data sources, as well as data sources that undergo continual change.

Figure 1:
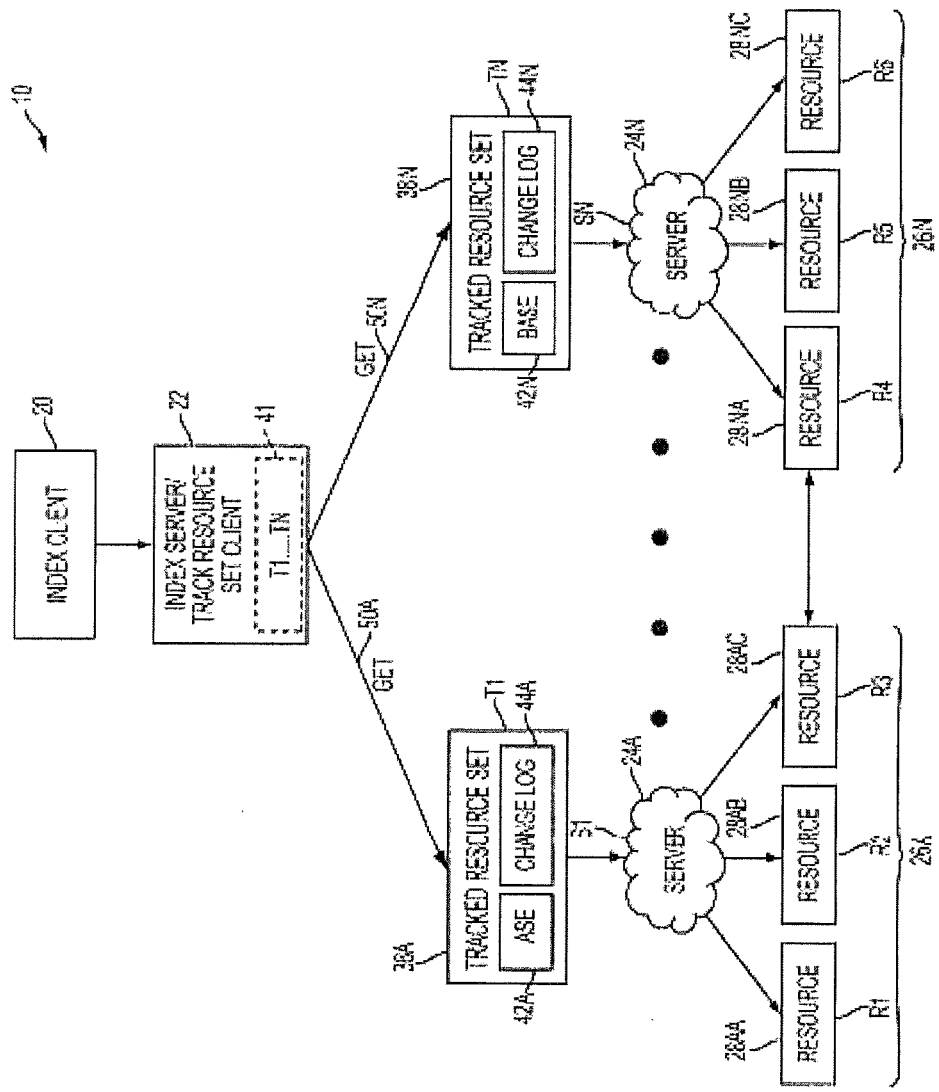
FIG. 1 is a block diagram of an exemplary data indexing system.

Referring now to FIG. 1, a diagram of an exemplary data indexing system 10 is illustrated. The data indexing system 10 may include an index client 20, an index server/tracked resource set client 22, and at least one server 24 (e.g., servers 24A, 24N). Each server 24 includes a corresponding resource set 26 (e.g., resource sets 26A, 26N) having a plurality or a finite number of resources 28 (e.g., resources 28AA, 28AB, 28AC and resources 28NA, 28NB, 28NC). A tracked resource set 38 (e.g., tracked resource sets 38A, 38N) corresponds to each of the resource sets 26, and is used to describe the resources 28 located in each of the resource sets 26. That is, the tracked resource set 38 provides a representation of the current state of the resource set 26. The index server/tracked resource set client 22 includes a data index 41, where the data index 41 saves an aggregation or collection of all of the tracked resource sets 38. The tracked resource set 38 is expressed as a base 42 (e.g., base 42A and base 42N) and a change log 44 (e.g., change logs 44A, 44N). Specifically, the base 42 is a portion of the tracked resource set 38 that lists the various member resources 28. The change log 44 is a portion of the tracked resource set 38 that includes a series of change events. The change events may be an addition, removal, or state of change of any of the member resources 28.

The index server/tracked resource set client 22 is a combined server/client that is in communication with both the index client 20 and the servers 24. Specifically, when interacting with one or more of the servers 24, the index server/tracked resource set client 22 acts as a client to request content regarding the resource set 26 from each of the servers 24. The index client 20 is a client that requests content regarding the resource set 26 from the data index 41 of the index server/tracked resource set client 22. Specifically, the index client 20 may send a query to the index server/tracked resource set client 22. The query requests content regarding the resource set 26 from the index server/tracked resource set client 22.

Thus, when interacting with the index client 20, the index server/tracked resource set client 22 acts as a server.

In the embodiment as shown, the data indexing system 10 includes N number of servers S1-SN. Each of the servers 24 maintains a corresponding resource set 26, as well as a corresponding tracked resource set T1-TN. Each of the servers 24 include criteria for determining the resources 28 that are members of the resource set 26 at any specific time. However, the index server/tracked resource set client 22 may not need to be aware of the criteria, and instead receives the resources 28 that are members of the resource set 26 at any specific time by interacting with the servers 24 using a tracked resource set protocol.

The servers 24 have implemented linked data standards, and expose or identify data (e.g., the resources 28) using the rules of linked data. Linked data describes an approach for exposing, sharing, and connecting pieces of data, information, and knowledge using uniform resource identifiers (URIs) and resource description framework (RDF). The rules of linked data include: 1. use URIs as names for things (e.g., such as the resources 28 of the data index system 10); 2. the URIs should be hypertext transfer protocol (HTTP) URIs; 3. provide information using RDF and a protocol and RDF query language (SPARQL); and 4. any resources 28 exposed by the servers 24 should include the URIs to other resources 28.

The resources 28 are each identified using a unique URI. For example, in the embodiment as shown, the server S1 includes resources R1, R2, and R3. The server SN includes resources R4, R5, and R6. The resources R1-R6 each include a unique URI. The URIs follow the RDF protocol. The resource R4 includes a link to another URI represented by the resource R3 (e.g., rule 4 of the rules of linked data). The resources 28 may be any types of data source that has been published using linked data standards (e.g., a database or a file).

Each server 24 provides an HTTP(S) URI corresponding to the respective resource set 26, which is referred to as a tracked resource set URI. A request 50 (e.g., requests 50A, 50N) of a representation of the state of the resource set 26 (e.g., an HTTP GET request) is sent from the index server/tracked resource set client 22 to the tracked resource sets 38, and returns a representation of the state of the resource set 26 in terms of the base 42 and the change log 44. The base 42 provides a point-in-time enumeration of members of the resource set 26, and the change log 44 describes a time series of adjustments describing changes to the members of the resource set 26. Thus, if the base 42 is empty, the change log 44 describes a history of how the resource set has grown since inception. If the change log 44 is empty, the base 42 is an enumeration of the resources 28 in the resources set 26.

The base 42 is an RDF container, where each member of the RDF container references one of the resources 28 that was in the resource set 26 at the time of computation. The change log 44 is represented by an RDF collection, where the entries correspond to change events arranged in reverse chronological order. In general, a gap does not exist between the base 42 and the change log 44 of a representation of a tracked resource set 38, however the change log 44 may contain earlier change event entries that would be accounted for by the base 42. A cutoff property of the base 42 identifies a point in the change log 44 where processing of change event may be cutoff, as older changes are already covered in the base 42.

FIG. 2 is an exemplary illustration of RDF information that is returned to the data index 41 of the index server/tracked resource set client 22 on a corresponding tracked resource set URI when the request 50 (e.g., the GET request) is sent.

Specifically, FIG. 2 illustrates exemplary portions of RDF information using Turtle (Terse RDF Triple Language). As seen in FIG. 2, the tracked resource set 38 provides references to the base 42 and the change log 44. The tracked resource set 38 provides information using RDF triples (e.g., using the form subject:predicate:object). Information is provided to the base 42 and the change log 44 using the predicates trs:base (e.g., for the base 42) and trs:change log (e.g., for the change log 44).

The index server/tracked resource set client 22 periodically polls the tracked resource set 38 for recent change events. Thus, the tracked resource set 38 provides an HTTP response containing triples for a referenced change log 44 (i.e., via a blank node or an inline named resource 28). Each of the servers 24 support etags, caching, and conditional GETs for the resources 28 of the tracked resource set 38, and regulate the base 42 to separate resources.

Turning now to FIG. 3, an exemplary illustration of the content of the change log 44 is shown. The change log 44 is illustrated in reverse chronological order, with the most recent changes illustrated first. The change log 44 provides a set of change events in a single-valued RDF collection-type property (e.g., which is called trs:changes as shown in FIG. 3). An RDF collection (i.e., a linked list), is used in the change log 44 to ensure entries retain the correct inverse chronological order.

The change events are identified using URIs. That is, the change events cannot be blank nodes. This allows clients (e.g., the index server/tracked resource set client 22) to recognize entries that have been seen before. The URIs of the change events are used to identify an event. That is, in other words, these URIs need not be independently GETable. Thus, in the embodiment as shown in FIG. 3, the change events may be a uniform resource name (URN), which is shown in lines 11-13 of FIG. 3.

Each change event has a sequence number (which is illustrated as trs:order in lines 19, 23, and 27 of FIG. 3). The sequence numbers are non-negative integer values that increase over time. A change event entry carries the URI of a changed resource 28, which is illustrated in FIG. 3 as trs:changed (e.g., see lines 18, 22 and 26 in FIG. 3), as well as an indication that is illustrated as rdf:type (which is illustrated in FIG. 3 as the letter "a" in lines 17, 21, and 25). The indication will indicate whether the changed resource 28 was added to the resource set 26, removed from the resource set 26, or has changed state while a member of the resource set 26. For example, FIG. 3 illustrates a first sequence number in the change log as 103 (see line 19), which is the most recent change. As changes occur, the servers 24 add new change events, which are added to the front of the list. The sequence number (e.g., 103, 102, and 101) of newer entries are greater than the previous entries (e.g., 103 is greater than 102, 102 is greater than 101). In the embodiment as shown in FIG. 3, the sequence numbers are consecutive numbers. However, the sequence numbers may be non-consecutive as well.

Continuing to refer to FIG. 3, the actual time of a change is not included in the change event. Instead, the sequence number (e.g., 103, 102, 101) is provided, which represents the sequence in time of each change. It should be noted that the URI included with the change event is unique, even in the event of server rollback where sequence numbers are reused. A time stamp may be used to generate a URI that meets this requirement (which is illustrated in lines 16, 20 and 24 of FIG. 3); however, alternative approaches may be used as well.

Since the change log 44 represents a series of changes made to a corresponding resource set 26 over a predetermined period of time, the change log 44 contains change events for every creation, deletion, and modification of the resources 28 during the predetermined period of time. The servers 24 report a resource modification event if the request 50 (e.g., a GET request) would return a semantically different response when compared to the last response available. Thus, because the resources 28 (shown in FIG. 1) have RDF content, the resource modification event is generally anything that affects the RDF triples significantly. However, the servers 24 may report a specific resource modification event in cases where there is no significant difference in the RDF triples as well. In general, the servers 24 do not report unnecessary change events, however this may occur if, for example, the base 42 is being computed while changes are occurring. The index server/tracked resource set client 22 is configured to ignore a creation event for any resource 28 that is already a member of the respective resource set 26, and as well as a deletion or modification event for any resource 28 that is not a member of the respective resource set 26.

In the embodiment as shown in FIG. 3, the change log 44 is relatively small. However, the change log 44 may also be larger in size, which requires changes to be segmented. For example, FIG. 4 is an alternative embodiment of a portion of the contents of a relatively larger change log 44. As shown in FIG. 4, the trs:previous reference (illustrated in line 13 of FIG. 4) is used to connect change events together (e.g., in the embodiment as shown, the change events with sequence numbers 101-103 are connected to the change event with sequence number 100 by the trs:previous reference). The most recent change events are included with the tracked resource set 38. Thus, the index server/tracked resource set client 22 to discover the most recent change event, and retrieve successively older change log resources until a change event that has already been processed (e.g., by a previous check) is encountered. There are no criteria as to where the server 24 breaks the change log into parts (e.g., the number of entries located within trs:ChangeLog is determined by each server 24).

To allow the index server/tracked resource set client 22 to retrieve change events in a specific segment of the change log using a single request 50 (e.g., the GET request) the servers 24 each include all of the triples corresponding to a specific change log segment in a response to the request 50 (i.e., in the representation of either the tracked resource set 38 or a trs: previous change log). This includes triples that have a subject that is the change log 44, the trs:changes list or entries, and the change events. The change log 44 and the trs:changes may be represented using blank nodes.

A chain of change log entries may continue back to the inception of the corresponding resource set 26 and contains the change events for every change that has been made since inception. However, the servers 24 may truncate the chain of change log entries at a specific point. That is, the oldest entries in the chain of change log entries may be deleted by removing the corresponding triples. To ensure that a new client (e.g., the index server/tracked resource set client 22) can always be started, the change log 44 contains a base cutoff event of a corresponding base 42, and all change events that have occurred since the base cutoff event. If the base 42 has no base cutoff event (i.e., the base 42 enumerates the resource set 26 at the time of inception) the change log 44 contains all change events. That is, no truncation is allowed. In one embodiment, the servers 24 maintain about seven days' worth of change events.

The base 42 of the tracked resource set 38 is an RDF container where each member references a specific resource 28 that was part of the resource set 26 at the time the base 42 was computed. FIG. 5 is an exemplary illustration of the contents of an RDF container that is created when a request 50 on a URI of the base 42 is returned. Each resource 28 in the resource set 26 is referenced from the RDF container by the predicate member (e.g., shown as rdfs:member in lines 7-9 and 11-12).

The base 42 may be broken into multiple pages, in which case the server 24 responds with a redirect message that directs the index server/tracked resource set client 22 to a first page resource. A representation of a page resource contains a subset of the base's 42 rfds:member predicates. The page resource contains another triple that includes a subject that is the page resource (i.e., not the base resource), with a reference to the next page. For example, with reference to FIG. 6, the last page in a list in indicated by trs:nextPage (shown in line 11) by a value of rdf:nil. The first page of the base 42 includes a trs:cutoffEventproperty (shown in line 5 of FIG. 6), which includes a value that is the URI of the most recent change event in a corresponding change log 44 that is already reflected in the base 42. This corresponds to the latest point in the change log 44 from which a client (e.g., the index server/tracked resource set client 22) may begin incremental monitoring or updating, if the client is to remain synchronized with further changes to the resource set 26.

Referring back to FIG. 1, the resource sets 26 may have a relatively high dynamic nature. Thus, the base 42 may only be a general approximation of the resource set 26. That is, for example, the base 42 may omit mention of a specific resource 28 that ought to have been included, or, alternatively the base 42 may include a specific resource 28 that ought to have been omitted. For each resource 28 that is incorrectly reported to the base 42, the server 44 includes a corrective change event in the change log 44 more recent than the base cutoff event. The corrective change event will provide correction for the specific resource 28 that was either incorrectly omitted or included. Thus, a client (e.g., the index server/tracked resource set client 22) is able to calculate the correct number of resources 28. Each of the servers 24 refers to a specific resource 28 using the same URI in the base 42 and for every change event.

The tracked resource set 38 supports an Extensible Markup Language (XML) for RDF that is referred to as RDF/XML (i.e., application/rdf+xml). In one embodiment, the tracked resource set 38 may support Turtle (i.e., text/turtle or application/x-turtle). HTTP content negotiation is used to select the representation that is actually used.

Referring generally to FIGS. 2-6, a namespace used for the exemplary resources 28 as shown is "http://jazz.net/ns/trs#" (e.g., see line 2 in FIGS. 2-6), having a default prefix of "trs". The tracked resource set 38 is referred to in FIGS. 2-4 as TrackedResourceSet (e.g., see line 4 of FIG. 2, line 6 of FIG. 3, and line 4 of FIG. 4). The tracked resource set 38 provides a representation of the current state of a specific resource set 26 (FIG. 1). As shown in Table 1 below, resource value-types are defined as follows: a resource includes a value that is a resource at a specified URI (i.e., HTTP GET is required), a local resource includes a value that is a resource defined by triples in the same representation as a referencing subject, and any resource is a value that is either a resource or a local resource as discussed.

TABLE 1

| Prefixed Name | Occurs | Value-type | Range | Description |
| --- | --- | --- | --- | --- |
| trs:base | exactly-one | Any Resource | any | An enumeration of the resources in the resource set. |
| trs:changeLog | exactly-one | Local Resource | trs:ChangeLog | A change log providing a time series of incremental adjustments to the resource set. |

Table 2 lists the properties of an exemplary base resource (e.g., target of the base predicate trs:base illustrated in FIG. 2, line 5, illustrated in FIG. 3, line 7, and in FIG. 4, line 5).

TABLE 2

| Prefixed Name | Occurs | Value-type | Range | Description |
| --- | --- | --- | --- | --- |
| rdfs:member | zero-or-many | Resource | any | A member resource of the resource set. |
| trs:cutoffEvent | zero-or-one | Any Resource | trs:Creation, trs:Modification, trs:Deletion | The most recent change log entry that is accounted for in this base. When rdf:nil, the base is an enumeration at the start of time. |

The change log 42 (FIG. 1) is referred to in FIGS. 2-6 as ChangeLog (e.g., see lines 6-7 of FIG. 2, lines 8-9 of FIG. 3, and lines 6-7 of FIG. 4). Table 3 illustrates the properties of the change log 42.

TABLE 3

| Prefixed Name | Occurs | Value-type | Range | Description |
| --- | --- | --- | --- | --- |
| trs:changes | exactly-one | Local Resource | rdf:List | The list of change event entries, ordered by decreasing change event trs:order. Events that occurred later appear earlier in the list. |
| trs:previous | zero-or-one | Resource | trs:ChangeLog | The continuation of the change log, containing the next group of chronologically earlier change events. |

Each entry in an trs:change list (e.g., lines 11-13 of FIG. 3 and lines 9-11 of FIG. 4) is a local resource representing a change event, with the properties as listed in Table 4:

TABLE 4

| Prefixed Name | Occurs | Value-type | Range | Description |
| --- | --- | --- | --- | --- |
| rdf:type | exactly-one | Resource | rdfs:Class | The type of the change event. One of trs:Creation, trs:Modification, or trs:Deletion. |
| trs:changed | exactly-one | Resource | any | The resource that has changed. |
| trs:order | exactly-one | Non-negative Integer | n/a | The sequence in time of the change event. |

Figure 7:
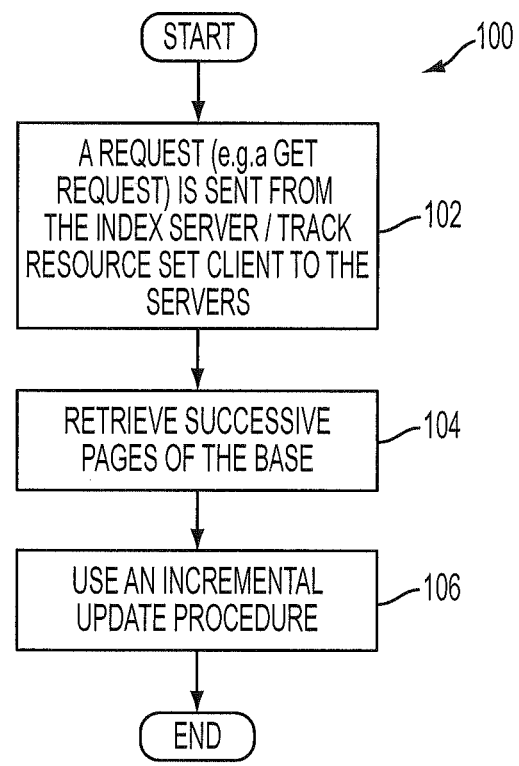
FIG. 7 is a process flow diagram of determining a complete collection of resources.

FIG. 7 is an exemplary flowchart illustrating a method of determining a complete collection of resources in each of the server's 24 resource set 26, and is indicated by reference number 100. Referring to both FIGS. 1 and 7, method 100 begins at block 102, where the request 50 (e.g., a GET request) is sent from the index server/tracked resource set client 22 to the servers 24 to retrieve a tracked resource set representation to learn the URI of the base 42. Method 100 may then proceed to block 104. In block 104, the request 50 retrieves successive pages of the base 42, adding each member resource 28 to the index server/tracked resource set client's 22 local replica of the resource set 26 (located in the data index 41). Method 100 may then proceed to block 106. In block 106, an incremental update procedure is invoked. The incremental update procedure is described in detail in FIG. 8.

In one embodiment, the index server/tracked resource set client 22 may execute 106 in parallel with 104, to substantially prevent the scenario where the index server/tracked resource set client 22 is unable to catch up to the current state of the resource set 26 using the change log 44 after initial processing, because the initial processing takes too long. Method 100 may then terminate.

It should be noted that it is up to the servers 24 to determine how often the base 42 may be computed. It is also up to the servers 24 to determine how to compute the base 42, either by enumerating the corresponding resource set 26 directly (e.g., by querying an underlying database), or, alternatively, by coalescing internal change log entries into a previous base 42.

Figure 8:
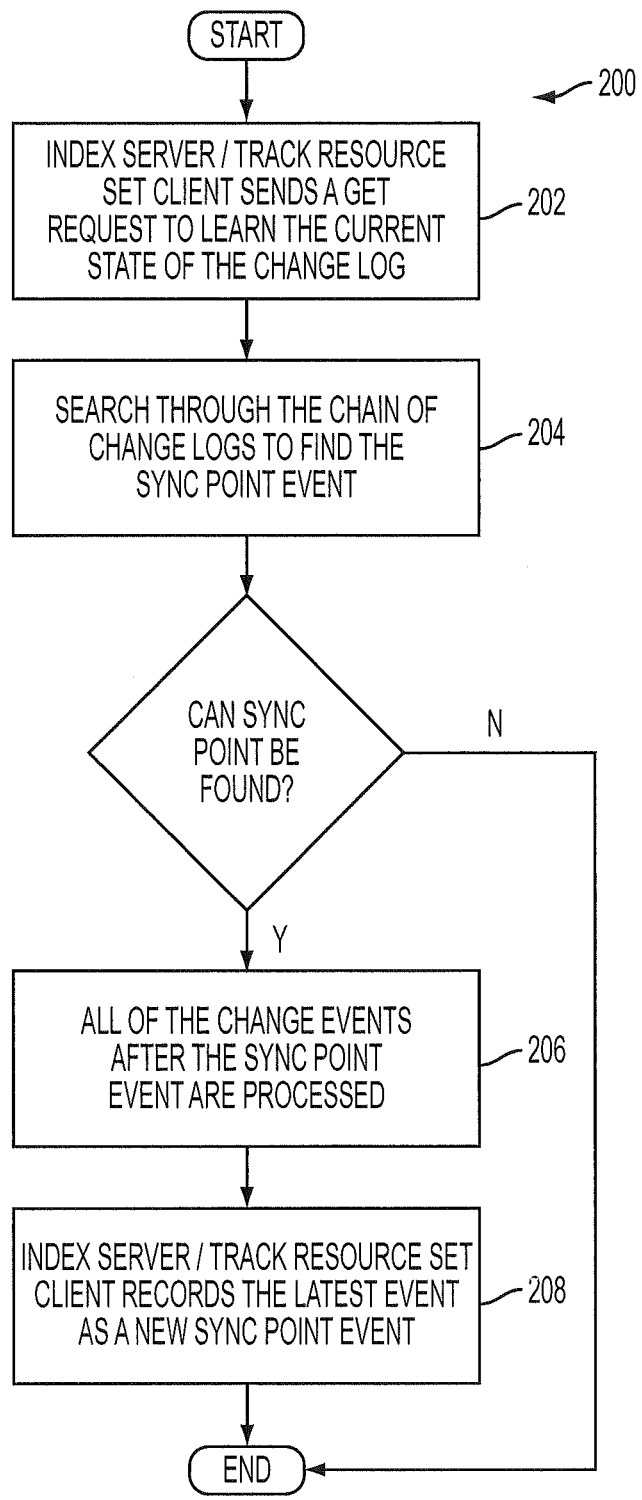
FIG. 8 is a process flow diagram illustrating executing an incremental update procedure.

FIG. 8 is an exemplary flowchart illustrating a method executing the incremental update procedure, and is indicated by reference number 200. In the method 200 as shown, the index server/tracked resource set client 22 has a local replica of the server's 24 resource set 26 as of a specific sync point event known to the index server/tracked resource set client 22.

The initial sync point event is illustrated in FIG. 5, line 5, and FIG. 6, line 5 as "trs:cutoffEvent". The incremental update procedure is invoked periodically (e.g., every 15 seconds). The frequency at which the incremental update procedure is invoked determines how up-to-date the data index 41 is. Referring to both FIGS. 1 and 8, method 200 begins at block 202. In block 202, the index server/tracked resource set client 22 sends the request 50 to retrieve the tracked resource set representation to learn the current state of the change log 44. Method 200 may then proceed to block 204. In block 204, the index server/tracked resource set client 22 searches through the chain of change logs 44 from most recent to least recent to find the sync point event (e.g., illustrated in FIGS. 5-6 as trs:cutoffEvent). In the event the index server/tracked resource set client 22 is unable to locate the sync point event, method 200 may then terminate. However, if the index server/tracked resource set client 22 locates the sync point event, method 200 may then proceed to block 206. In block 206, all of the change events are processed after the sync point event, from most recent to least recent, making corresponding changes to the index server/tracked resource set client's 22 local replica of the resource set 26. Method 200 may then proceed to block 208. In block 208, the index server/tracked resource set client 22 will record the latest event as a new sync point event. In one approach, the index server/tracked resource set client 22 may record a number of recently processed events for possible future undo in the event of server roll-back. Method 200 may then terminate.

In the event that the index server/tracked resource set client 22 is unable to find a sync point (e.g., as discussed in 204) one of two events may have occurred. First, the server 24 may have truncated the change log 44, or the server 24 has been rolled back to an earlier state. If the index server/tracked resource set client 22 has been retaining a local record of previously processed events, the index server/tracked resource set client 22 may be able to determine a server rollback. In this event, the index server/tracked resource set client 22 may undo changes to the local replica of the server's resource set 26 back to the sync point, and resume processing.

The index server/tracked resource set client 22 has updated the replica of the server's 24 resource set 26, which is a generally accurate reflection of the resources 28 as described by the retrieved tracked resource set 38. However, it should be noted that the server's 24 actual resource set 26 may have undergone additional changes, and the index server/tracked resource set client 22 may not actually catch up with the servers 24. However, the replica of the resource set 26 (stored on the index server/tracked resource set client 22) may be kept substantially up-to-date.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of, a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of data indexing by a tracked resource set client, comprising:
   sending a plurality of requests for a representation of a state of a plurality of resource sets by the tracked resource set client to a plurality of servers, each server storing at least one of the plurality of resource sets and each resource set including a plurality of resources;
   receiving, as the representation of the state of the plurality of resource sets, a plurality of tracked resource sets in response to the plurality of requests, each tracked resource set corresponding to one of the plurality of resource sets and identifying the plurality of resources of that one resource set based on rules of linked data;
   aggregating the plurality of tracked resource sets in a data index that is part of the tracked resource set client; and
   periodically executing an incremental update procedure by the tracked resource set client,
   wherein the tracked resource set client has a local replica of each of the plurality of resource sets as of a sync point event and a change log portion that describes a plurality of change events of the plurality of resources, the sync point event being one of a plurality of events that are recorded to configure an undo operation during a server roll-back,
   wherein the incremental update procedure includes sending a request to learn a current state of the change Log and find the sync point event and:
      processing, when the sync point event is located, the plurality of change events for the data index after the sync point event from most recent to least recent and making corresponding changes to the local replica, and
      performing, when the tracked resource set client is unable to find the sync point event the server rollback to an earlier state,
   wherein the tracked resource set client searches through the change log portion from a most recent to a least recent to find the sync point event.

2. The method of claim 1, wherein each tracked resource set includes a base and a change log, the base portion listing members of the corresponding one of the plurality of resource sets and the change log describing the plurality of change events of the plurality of resources of that one resource set.

3. The method of claim 2, further comprising:
   utilizing uniform resource identifiers by the change log to describe the plurality of change events.

4. The method of claim 2, comprising providing the plurality of change events as one of an addition, removal, and a state of change of the plurality of resources.

5. The method of claim 1, comprising:
   identifying each of the plurality of resources by utilizing a unique uniform resource identifier that follows a resource description framework protocol.

6. The method of claim 1, comprising:
   providing information by the plurality of tracked resource sets using resource description framework triples, the resource description framework triples including a form of subject:predicate:object.

7. The method of claim 1, comprising:
   communicating by the tracked resource set client with an index client, wherein the tracked resource set client is a server to the index client.

8. The method of claim 7, comprising:
   receiving a query by the tracked resource set client from the index client requesting content regarding the plurality of resource sets.

9. The method of claim 1, comprising:
recording a latest event of the plurality of change events as a new sync point event at a conclusion of each periodic execution of the incremental update procedure.

* * * * *